US010495170B2

(12) United States Patent
Love et al.

(10) Patent No.: US 10,495,170 B2
(45) Date of Patent: Dec. 3, 2019

(54) LOAD COMPENSATING SPRING ISOLATOR

(71) Applicant: Vibracoustic North America L.P., South Haven, MI (US)

(72) Inventors: Mickey L. Love, Londonderry, NH (US); Neil Stewart Cummings, Ann Arbor, MI (US); Lee Hayden Dutton, Manchester, NH (US)

(73) Assignee: VIBRACOUSTIC NORTH AMERICA L.P., South Haven, MI (US)

( * ) Notice: Subject to any disclaimer, the term of this patent is extended or adjusted under 35 U.S.C. 154(b) by 0 days.

(21) Appl. No.: 15/729,902

(22) Filed: Oct. 11, 2017

(65) Prior Publication Data

US 2018/0100556 A1  Apr. 12, 2018

Related U.S. Application Data

(60) Provisional application No. 62/407,174, filed on Oct. 12, 2016.

(51) Int. Cl.
| *F16F 1/12* | (2006.01) |
| *B60G 11/40* | (2006.01) |
| *B60G 11/16* | (2006.01) |
| *B60G 11/14* | (2006.01) |
| *B60G 15/06* | (2006.01) |

(52) U.S. Cl.
CPC .............. *F16F 1/128* (2013.01); *B60G 11/14* (2013.01); *B60G 11/16* (2013.01); *B60G 15/063* (2013.01); *F16F 1/126* (2013.01); *B60G 2204/1242* (2013.01); *B60G 2204/12422* (2013.01)

(58) Field of Classification Search
CPC .... F16F 1/12; F16F 1/122; F16F 1/126; F16F 1/128; B60G 11/14; B60G 11/16; B60G 15/063; B60G 2204/1242; B60G 2204/12422
USPC .................... 267/221; 280/124.162, 124.179
See application file for complete search history.

(56) References Cited

U.S. PATENT DOCUMENTS

| 6,149,171 A * | 11/2000 | Bono ..................... B60G 11/16 280/124.179 |
| 8,414,004 B2 * | 4/2013 | Onda ..................... B60G 11/16 267/140.4 |
| 9,604,516 B2 * | 3/2017 | Cha ........................ B60G 11/16 |

(Continued)

FOREIGN PATENT DOCUMENTS

| DE | 102010028290 A1 | 11/2011 |
| EP | 1743784 A2 | 1/2007 |

OTHER PUBLICATIONS

International Search Report, PCT/US2017/056328, dated Feb. 9, 2018.

*Primary Examiner* — Thomas J Williams
(74) *Attorney, Agent, or Firm* — Fishman Stewart PLLC

(57) ABSTRACT

A spring isolator that may include a reinforcing insert, at least one flow hole, a ramp, a wall, a track/groove, an inner wall, an outer wall, and/or a locator pin. The spring isolator may be molded over the reinforcing insert and/or may be secured to the reinforcing insert via at least one flow hole. The spring isolator may include a ramp, a wall, track/groove, an inner wall, and/or an outer wall that may engage and/or retain a coil spring. One or more locator pins and/or a cavity and raised portion may secure the spring isolator to a spring seat.

20 Claims, 8 Drawing Sheets

(56) References Cited

U.S. PATENT DOCUMENTS

2003/0209395 A1* 11/2003 Fukaya .................. B60G 11/14
                                                      188/322.12
2003/0222386 A1    12/2003 Duerre et al.
2016/0031280 A1*  2/2016 Arano .................... B60G 11/16
                                                      267/219

* cited by examiner

LOAD COMPENSATING SPRING ISOLATOR

CROSS-REFERENCE TO RELATED APPLICATIONS

This application claims the benefit of U.S. provisional application No. 62/407,174, filed 12 Oct. 2016 (the '174 application) and is hereby incorporated by reference as though fully set forth herein.

BACKGROUND a. Technical Field

The present disclosure relates to spring isolators, including methods and systems of load compensating spring isolators.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

A spring (e.g., coil, helical), may be used to store energy (e.g., loads), temporarily and/or absorb vibration and/or sharp impacts (e.g., shocks). A spring may be engaged by a spring isolator. The spring isolator may provide support and/or secure the coil spring in a particular position. The spring isolator may be attached to and/or in contact with a larger supporting member, such as a spring seat. The spring isolator may maintain the position of the coil spring as the coil spring may be compressed and/or expanded during operation. The isolator may compensate for the load delivered by the coil spring and/or may improve performance of the coil spring. Among other things, it may be desirable to provide a spring isolator that provides isolation of road noise and/or high frequency vibration. It may also be desirable to provide a spring isolator that provides additional and/or improved structural support. In that regard, it may be desirable to provide a spring isolator system in which a pierce point does not change and/or ride quality is not sacrificed.

The foregoing discussion is intended only to illustrate the present field and should not be taken as a disavowal of claim scope.

SUMMARY

In an embodiment, a spring isolator assembly may include an insert, wherein the insert includes a ramp at a first end, a spring stop at a second end, and a locator pin. The spring isolator assembly may include an outer layer configured to receive a portion of a spring, the outer layer including a spring track, an inner wall, and an outer wall, wherein the outer layer surrounds the insert. The spring isolator assembly may include an outer layer that may be molded over the insert and may be secured to the insert via at least one passage of the insert. The spring isolator assembly may include an insert that may include a passage through which a portion of the outer layer may engage the insert. The spring isolator assembly may include an insert wherein a portion of the locator pin of the insert may protrude from the outer layer and may be configured to engage a portion of a spring seat. The spring isolator assembly may include a spring track that may be disposed between the ramp at the first end of the insert to the spring stop at the second end of the insert. The spring isolator assembly may be configured wherein at least one of the spring track, the inner wall, and the outer wall may selectively engage a portion of the spring. The spring isolator assembly may include an inner wall and an outer wall that may engage a portion of the ramp and the spring stop. The spring isolator assembly may be configured wherein one or more of the spring stop of the insert and the outer layer may be configured to engage an end of the spring. The spring isolator assembly may include an outer layer that may include a drain, wherein the drain may be configured to remove water and/or debris from the spring track. The spring isolator assembly may include an outer layer that may include a cavity, wherein the cavity may be configured to engage a portion of a spring seat.

In an embodiment, a spring isolator assembly may include a curvilinear insert, wherein the curvilinear insert may include a ramp at a first end and a spring stop at a second end. The spring isolator assembly may include a curvilinear outer layer, wherein the outer layer may encompass (e.g., surround, over-mold), the curvilinear insert. The spring isolator assembly may include a curvilinear insert that may include a plurality of passages that may be configured to engage the curvilinear outer layer. The spring isolator assembly may include a curvilinear insert that may include one or more of a locator pin, a raised portion, and a cavity, wherein the locator pin, the raised portion, and the cavity may be configured to selectively engage a spring seat. The spring isolator assembly may include a portion of the locator pin that may extend through the curvilinear outer layer to selectively engage a spring seat. The spring isolator assembly may include a curvilinear outer layer that may include a spring track that may be disposed between an inner wall and an outer wall. The spring isolator assembly may include at least one of the spring track, the inner wall, and the outer wall of the curvilinear layer that may be configured to selectively engage a spring.

In an embodiment, a spring isolator assembly may include a radial insert, wherein the radial insert may include a ramp at a first end and a coil spring stop at a second end. The spring isolator assembly may include a radial outer layer, wherein the radial outer layer may encompass a portion of the radial insert. The spring isolator assembly may include a radial insert that may include a plurality of passages that may be configured to engage one or more of the radial outer layer and a locator pin to selectively engage a coil spring seat. The spring isolator assembly may include a ramp that may be situated between 145 degrees and 212 degrees radially from the coil spring stop. The spring isolator assembly may include a radial outer layer that may include a coil spring track that may be disposed between an inner wall and an outer wall for selectively engaging a coil spring. The spring isolator assembly may include at least one of a locator pin, raised portion, and/or a cavity for selectively engaging a portion of a coil spring seat. The spring isolator assembly may include a coil spring stop that may be configured to engage an end of a coil spring.

The foregoing and other aspects, features, details, utilities, and advantages of the present disclosure will be apparent from reading the following description and claims, and from reviewing the accompanying drawings.

DETAILED DESCRIPTION

Figure 1A:
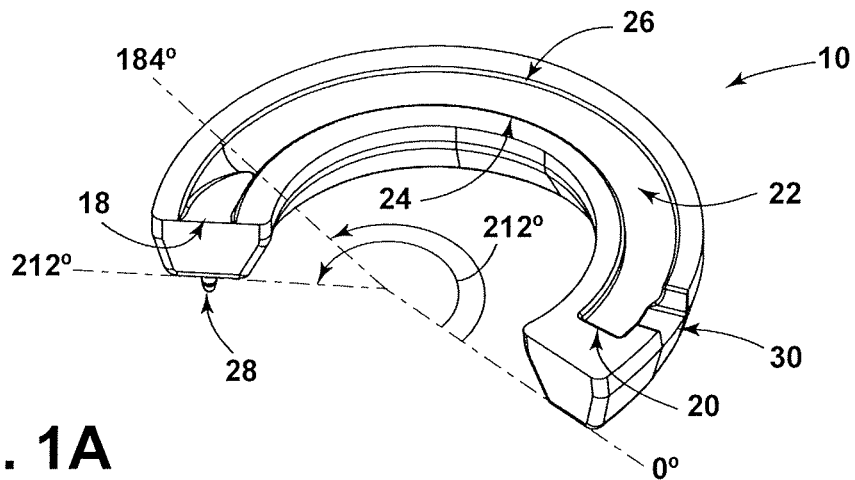
FIGS. 1A-1C are top perspective views generally illustrating an embodiment of a spring isolator, in accordance with teachings of the present disclosure.
Figure 1B:
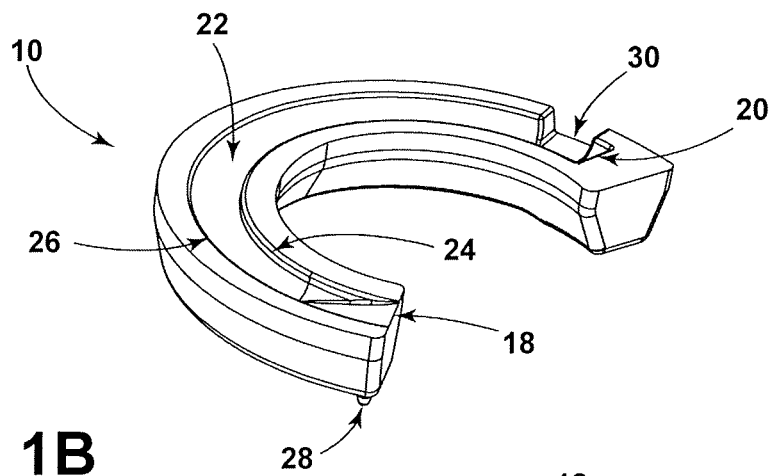
Figure 1C:
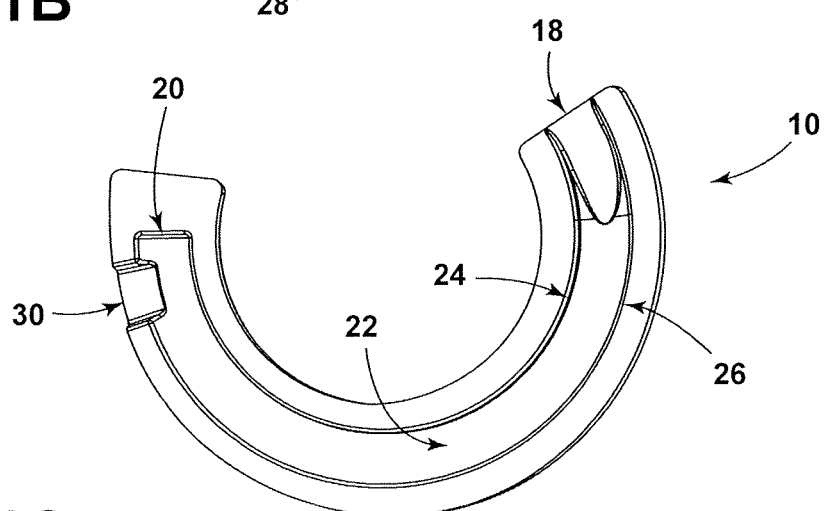

Referring now to the drawings, FIGS. 1A-1C generally illustrate an embodiment of a spring isolator 10. Spring isolator 10 may include a ramp 18, a spring stop 20, a track/groove (i.e., spring track), 22, an inner wall 24, an outer wall 26, a locator pin 28, and/or a water drain 30. Spring isolator 10 may be configured (e.g., molded), of a flexible material (e.g., rubber). Spring isolator 10 may be configured to include a ramp 18 and/or a spring stop 20. Ramp 18 and/or spring stop 20 may be configured on opposite ends of spring isolator 10. A track/groove 22 may be configured to connect ramp 18 and/or spring stop 20. Track/groove 22 may include an inner wall 24 and/or an outer wall 26. Track/groove 22 may be configured to receive a spring (e.g., helical spring), such that an end of the spring may engage a spring stop 20 of a spring isolator 10. One or more locator pins 28 may be integrated into spring isolator 10. One or more locator pin 28 may secure spring isolator 10 to a spring seat 32. The teen "locator pin" is intended to encompass various formations that can be used as a locator. In embodiments, one or more water drains 30 may be included in spring isolator 10. Drains 30 may permit foreign and/or unwanted materials (e.g., water, debris) that may accumulate in spring isolator 10 to drain (e.g., exit).

In embodiments, spring isolator 10 may be used in one or more locations in a vehicle suspension system. For example and without limitation, spring isolator 10 may be used in conjunction with a MacPherson strut system that may located in the front and/or rear of a vehicle. Spring isolator 10 may be configured at either end of the Macpherson strut system, or both. Spring isolator 10 may be configured for use in other vehicle suspension systems (e.g., double wishbone), that may include one or more coil springs 34 in either front and/or rear positions of a vehicle.

In embodiments, spring isolator 10 may be engaged by coil spring 34. An end of coil spring 34 may engage spring stop 20 of spring isolator 10. Coil spring 34 may also engage a track/groove 22 that may extend radially from spring stop 20 to ramp 18. In embodiments, ramp 18 may be configured to begin approximately 184 degrees from spring stop 20. It should be understood that the position of ramp 18 relative to spring stop 20 is exemplary, and not limiting. Ramp 18 may be positioned at other angles relative to spring stop 20, such as, but not limited to, 145 degrees through 212 degrees. In embodiments, most of the vehicle suspension load transferred from coil spring 34 to spring isolator 10 may be concentrated at spring stop 20 and/or ramp 18. By including a reinforcing insert 14 within spring isolator 10, the vehicle suspension load previously concentrated at spring stop 20 and/or ramp 18 may be compensated (e.g., dispersed, distributed), throughout spring isolator 10 via track/groove 22.

Figure 2A:
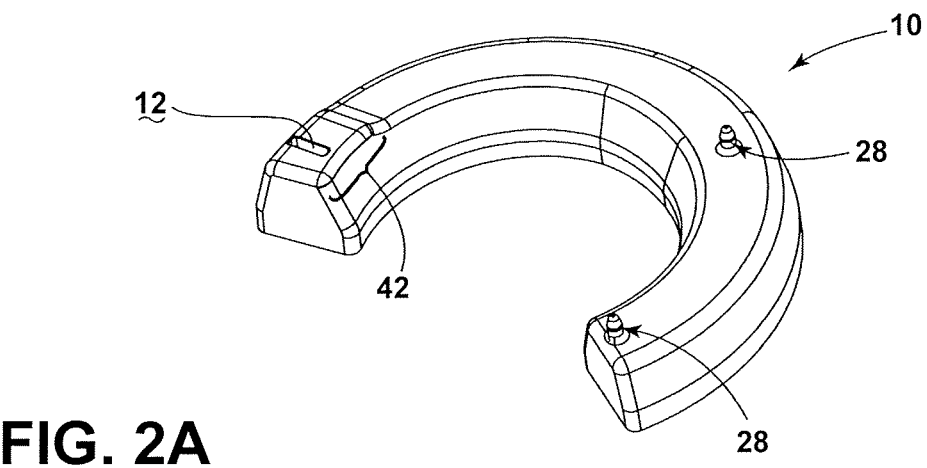
FIGS. 2A-2C are bottom perspective views generally illustrating the embodiment of the spring isolator in FIGS. 1A-1C, in accordance with teachings of the present disclosure.
Figure 2B:
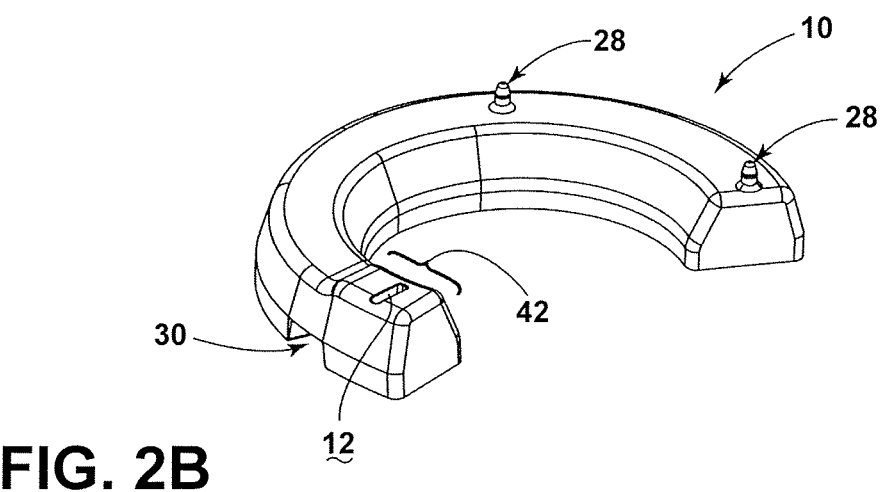
Figure 2C:
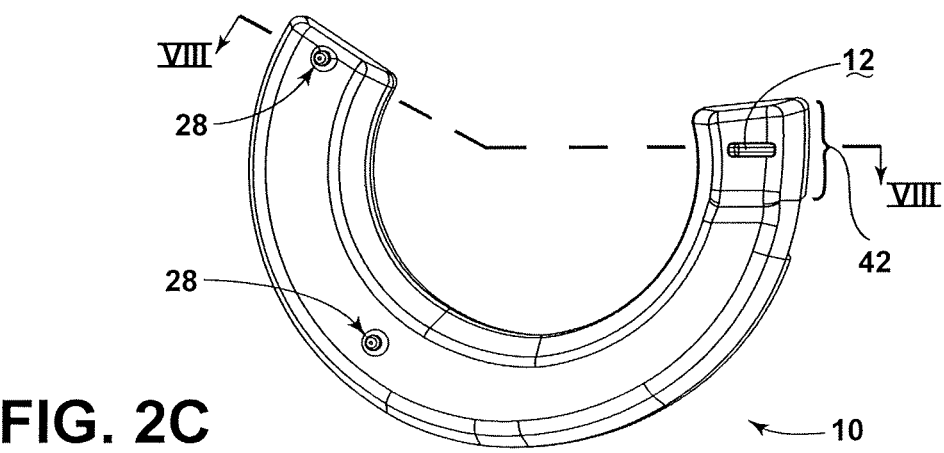

FIGS. 2A-2C generally illustrate spring isolator 10. In embodiments, spring isolator 10 may be configured (e.g., molded), of a flexible material (e.g., rubber). In embodiments, cavity 12 may be included in spring isolator 10. In embodiments, cavity 12 may be configured in proximity to ramp 18. In embodiments, cavity 12 may be configured in proximity to spring stop 20. In embodiments, one or more cavities 12 may be configured about spring isolator 10. One or more cavities 12 may engage one or more raised portions 42 (see, e.g., FIG. 8), of spring seat 32. In embodiments, spring isolator 10 may include one or more locator pins 28 that may engage one or more locator pin holes 40 of spring seat 32.

Figure 3:
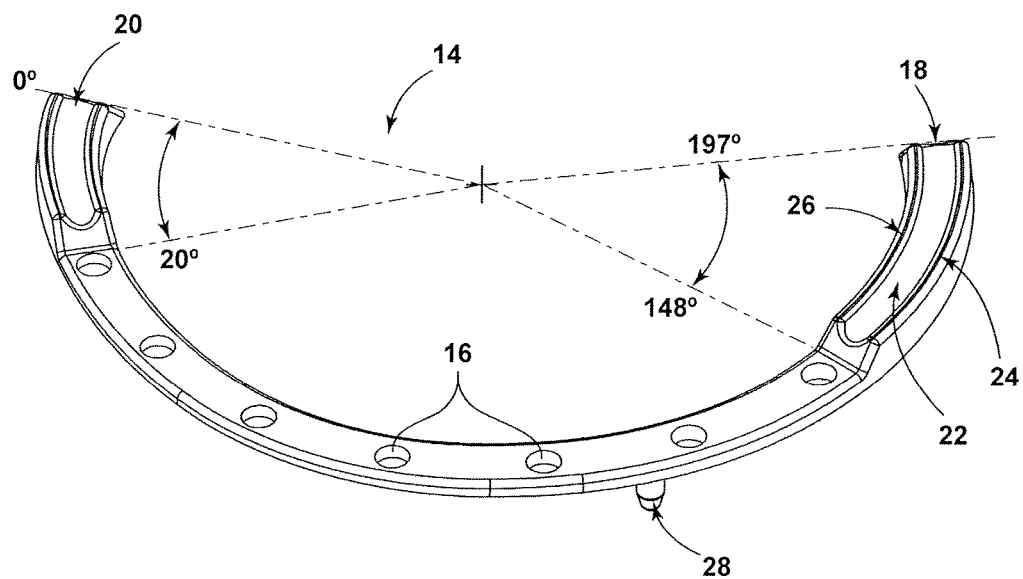
FIG. 3 is a perspective view generally illustrating an embodiment of a reinforcing insert, in accordance with teachings of the present disclosure.

FIG. 3 generally illustrates reinforcing insert 14 associated with spring isolator 10. In embodiments, reinforcing insert may be disposed at least partially within spring isolator 10 (see, e.g., FIG. 5). Reinforcing insert 14 may include one or more flow holes 16, through which a moldable material (e.g., rubber, polymer), may flow. Reinforcing insert 14 may be constructed of materials that may strengthen spring isolator 10 (e.g., polymer, metal), and/or permit a load received from coil spring 34 to be compensated (e.g., distributed), via reinforcing insert 14. In embodiments, other suitably rigid and/or semi-rigid materials may be used to construct reinforcing insert 14.

Figure 5:
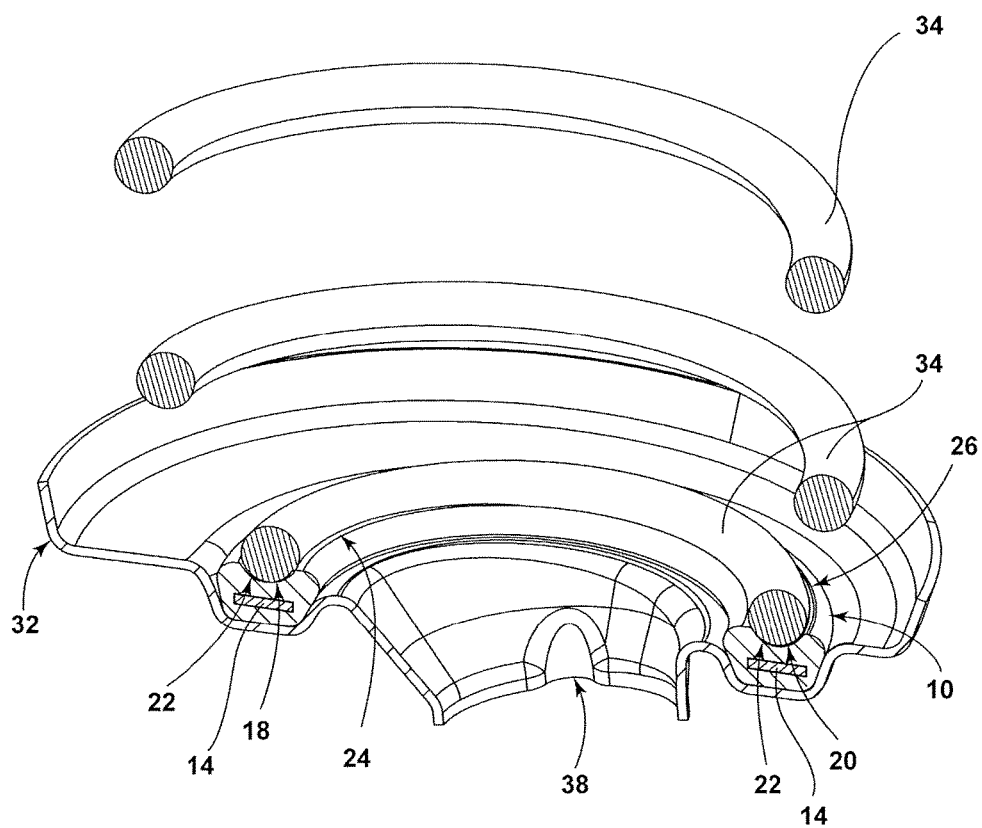
FIG. 5 is a sectional perspective view generally illustrating an embodiment of a spring isolator, coil spring, and spring seat in accordance with teachings of the present disclosure.
Figure 8:
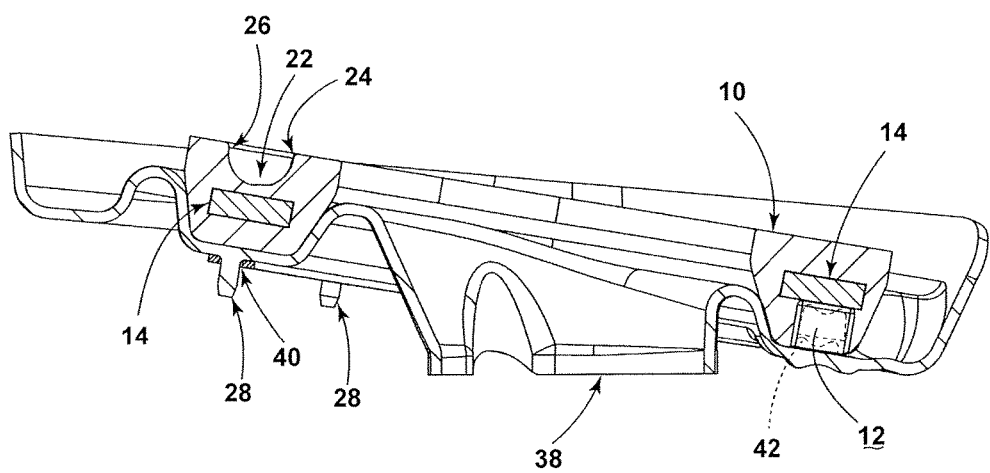
FIG. 8 is a sectional perspective view generally illustrating an embodiment of a spring isolator and a spring seat in accordance with teachings of the present disclosure.

In embodiments, reinforcing insert 14 may be integrated (e.g., over-molded), by spring isolator 10 (see, e.g., FIGS. 5 and 8). Reinforcing insert 14 may include one or more flow holes (e.g., passages), 16. Flow holes 16 may permit a material (e.g., foam urethane elastomer), forming spring isolator 10 to pass through flow holes 16 and/or secure reinforcing insert within spring isolator 10. Reinforcing insert 14 may include ramp 18 that may be disposed at one end of reinforcing insert 14. Ramp 18 may engage track/groove 22, inner wall 24, and/or outer wall 26. Track/groove 22 may be configured with an incline (e.g., slope). Track/groove 22 may engage spring (e.g., coil, helical), 34.

In embodiments, track/groove 22 of spring isolator 10 and/or reinforcing insert 14 may have a spring stop 20 at one end (i.e., first end), of track/groove 22 and a ramp 18 at the other end (e.g., second end), of track/groove 22. Spring stop 20 may include track/groove 22, inner wall 24, and/or outer wall 26. In embodiments, reinforcing insert 14 may include one or more locator pins 28. Locator pins 28 may be configured to engage spring seat 32 via one or more locator pin holes 40. In embodiments, locator pins 28 may be configured on a side of reinforcing insert 14 opposite of ramp 18 and/or spring stop 20.

Figures 4A, 4B:
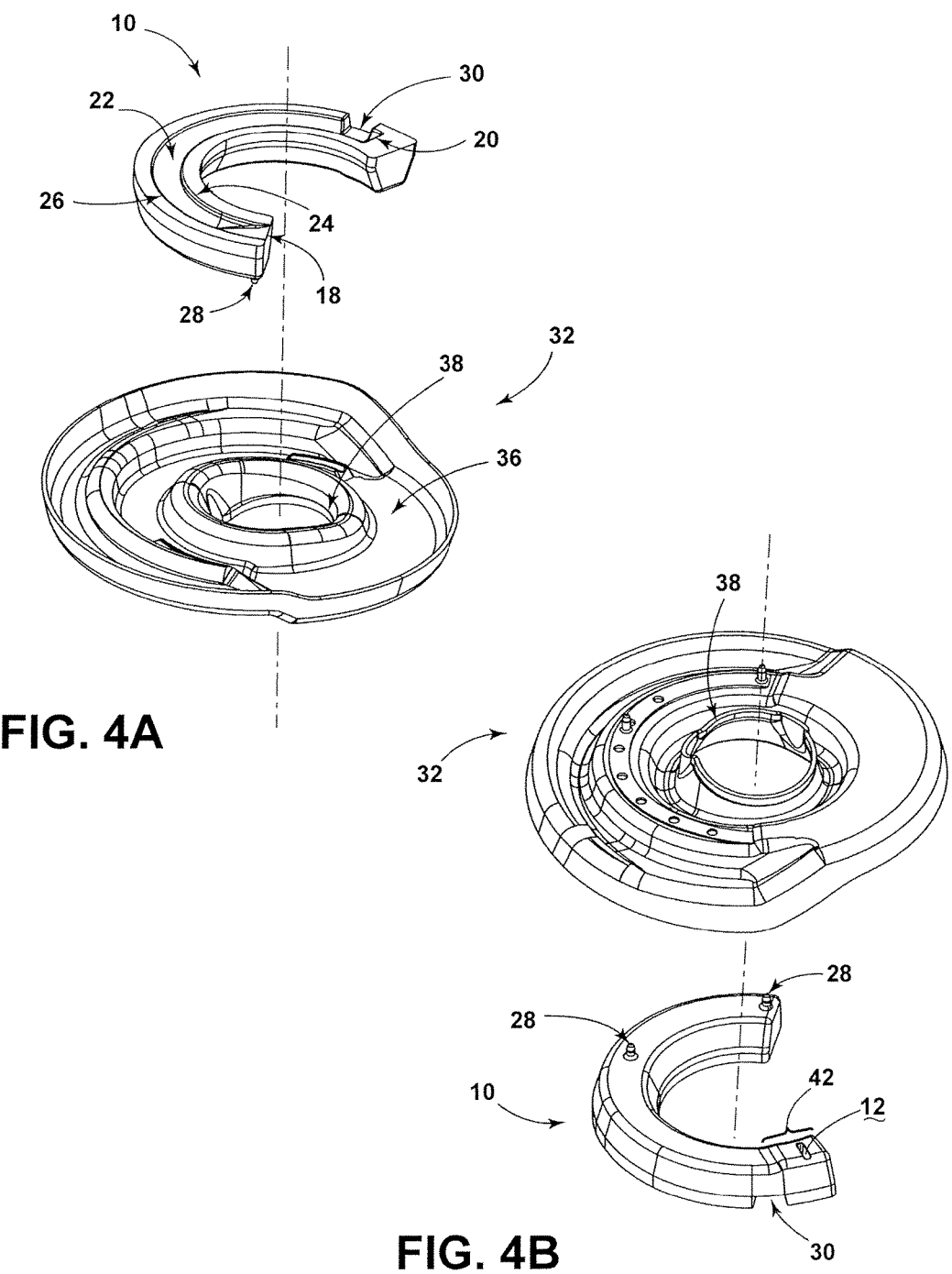
FIGS. 4A-4B are perspective views generally illustrating embodiments of a spring isolator and a spring seat, in accordance with teachings of the present disclosure.

FIGS. 4A-4B generally illustrate spring seat 32 associated with spring isolator 10. Spring seat 32 may include indentation 36 that may be configured to receive spring isolator 10. Spring seat 32 may include raised portion 42 that may be configured to engage cavity 12 of spring isolator 10. Cavity 12 may be included (i.e., integrated) in spring isolator 10. In embodiments, one or more cavities 12 and/or one or more locator pins 28 may engage and/or stabilize spring seat 10 within indentation 36.

FIG. 5 generally illustrates spring seat 32 and coil spring 34 associated with spring isolator 10. Coil spring 34 may engage spring isolator 10 and/or spring seat 32. At least a portion of coil spring 34 may engage spring stop 20 of spring isolator 10. A portion of coil spring 34 extending from (e.g., adjacent to), the end of coil spring 34 may engage track/groove 22, inner wall 24, and/or outer wall 26 of spring isolator 10. At least a portion of coil spring 34 may engage ramp 18 of spring isolator 10. Ramp 18 may engage track/groove 22, inner wall 24, and/or outer wall 26. Spring seat 32 may be configured annularly around (e.g., about), shock passage 38. Shock passage 38 may be configured to receive and/or engage a shock absorber (e.g., damper).

In embodiments, coil spring 34 may engage spring isolator 10. An end of the coil spring 34 may engage (e.g., contact), spring stop 20 of spring isolator 10. The coil spring 34 may be configured to engage ramp 18, track/groove 22, inner wall 24, and/or outer wall 26. In embodiments, a load may applied to coil spring 34 that may be transmitted (e.g., transferred), to spring isolator 10 and/or spring seat 32. The load may be applied in the form of a jounce and/or rebound load. A jounce load may be defined as the result of upward movement and/or compression of one or more suspension components, such as, but not limited to, coil spring 34. A rebound load may be defined as the downward movement and/or extension of one or more suspension components, such as, but not limited to, coil spring 34.

In embodiments, ramp 18 and/or spring stop 20 may receive a large portion (e.g., 200-2000 N) of the load (e.g., jounce, rebound), transmitted by the coil spring to spring isolator 10. Spring isolator 10 may distribute and/or dissipate the load transmitted by the coil spring to spring seat 32. In embodiments, one or more locator pins 28 of spring isolator 10 may be configured to engage a spring seat 32 and/or prevent the movement (e.g., rotation), of spring isolator 10.

Figure 6A:
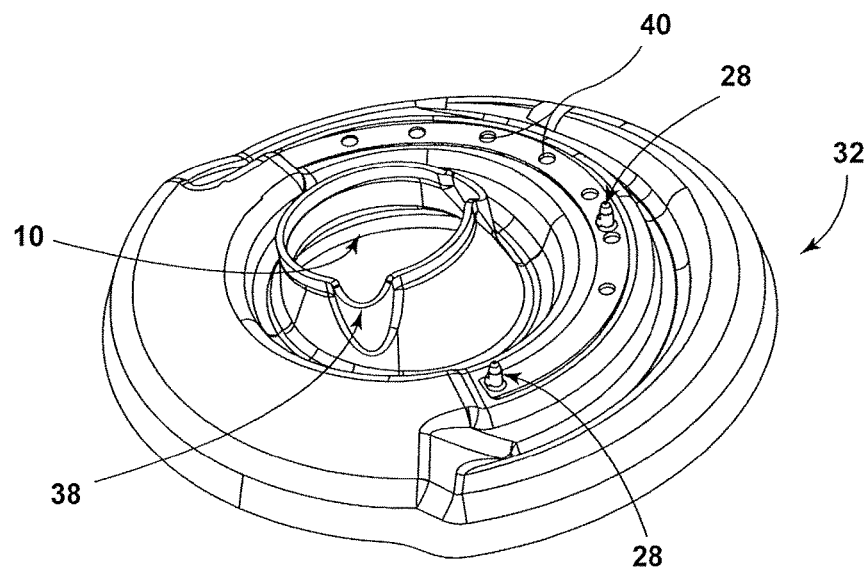
FIGS. 6A-6B are top and bottom perspective views, respectively, generally illustrating embodiments of a spring isolator and spring seat in accordance with teachings of the present disclosure.
Figure 6B:
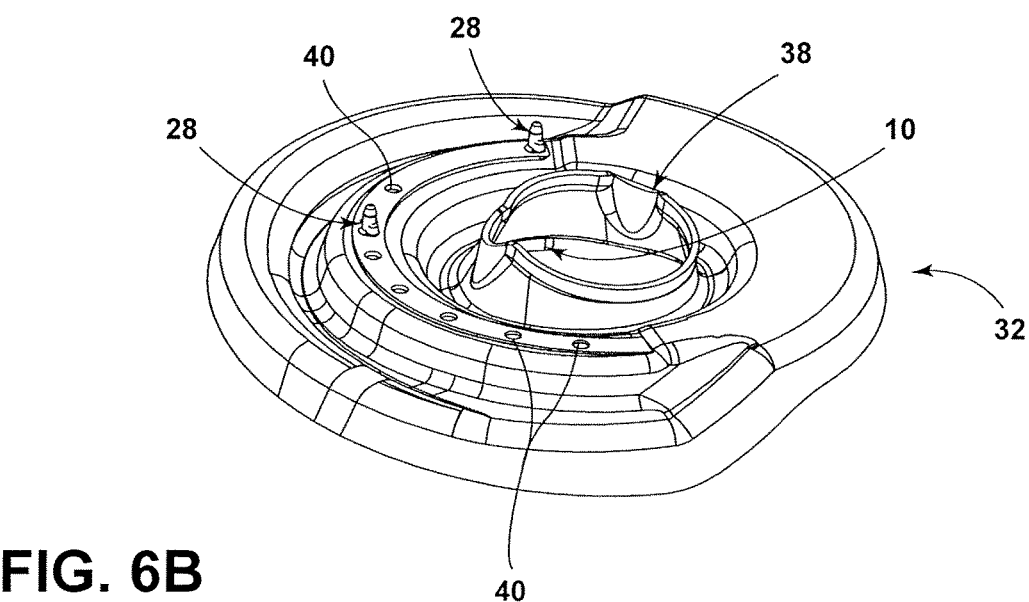

FIGS. 6A-6B generally illustrate a spring seat 32 associated with a spring isolator (e.g., spring isolator 10 in FIGS. 1A-C, 2A-C, 4A-B). It should be understood that spring isolator 10 may be associated with other suspension and/or body components of a vehicle and that the embodiments of spring seat 32 described herein are exemplary and not limiting. Spring seat 32 may include one or more locator pin holes 40 (i.e., receiving formations), that may engage one or more locator pins 28 of spring isolator 10. Locator pin holes 40 may be configured to engage locator pins 28 of different shapes and/or sizes (e.g., cylindrical, square), that may permit joining (e.g., assembly), of spring isolator 10 to spring seat 32 in one or more predetermined orientations. In embodiments, the configuration (e.g., placement), of locator pins 28 and/or locator pin holes 40 may permit the joining of spring isolator 10 and spring seat 32. In embodiments, spring isolator 10 may be configured to engage spring seat 32 annularly around (e.g., about), shock passage 38.

Figure 7A:
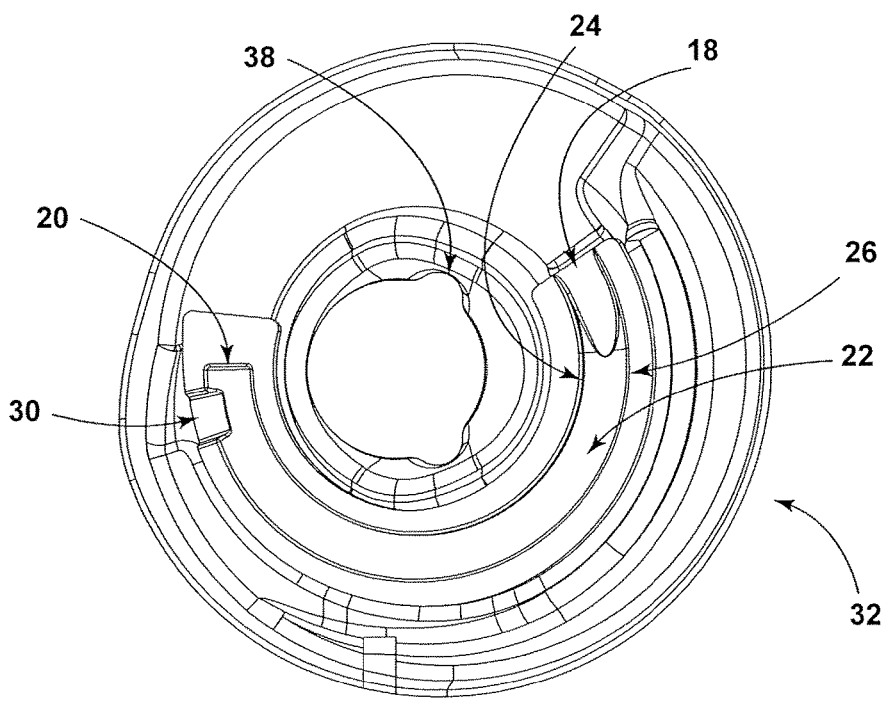
FIGS. 7A-7B are top and bottom views, respectively, generally illustrating embodiments of a spring isolator and spring seat in accordance with teachings of the present disclosure.
Figure 7B:
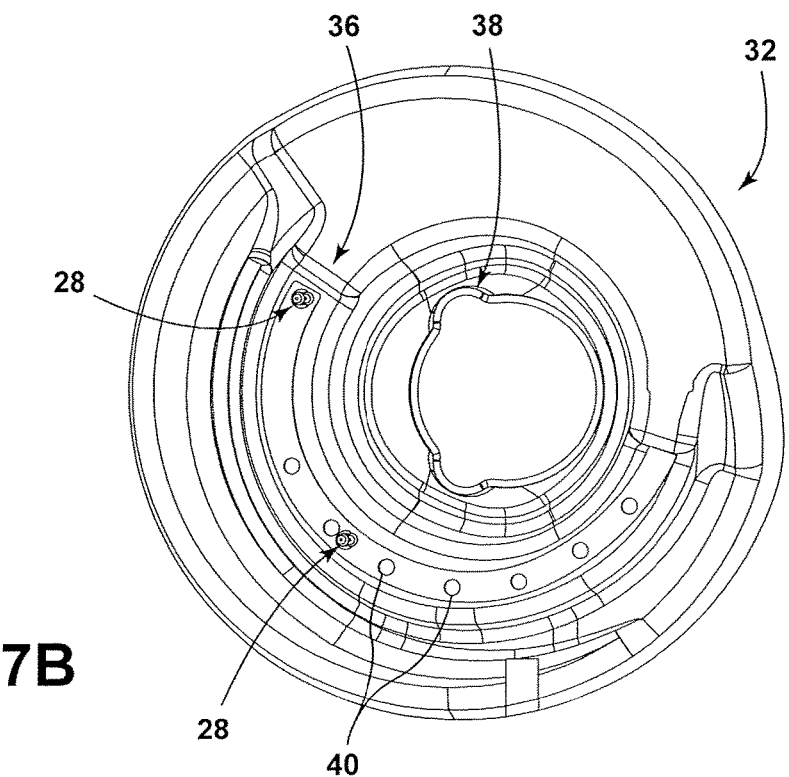

FIGS. 7A-7B generally illustrate a spring seat 32 associated with a spring isolator (e.g., spring isolator 10 in FIGS. 1A-C, 2A-C, 4A-B). Spring isolator 10 may be configured to engage an indentation 36 (e.g., as shown in FIG. 7B), of spring seat 32. In embodiments, spring isolator 10 and/or spring seat 32 may be configured annularly about shock passage 38. One or more locator pins 28 of spring isolator 10 may engage one or more locator pin holes 40 of spring seat 32. Spring isolator 10 may include ramp 18, spring stop 20, track/groove 22, inner wall 24, outer wall 26, and/or water drain 30. Ramp 18 may be configured at one end of spring isolator 10. Ramp 18 may be configured to engage track/groove 22, inner wall 24, and/or outer wall 26 of spring isolator 10. In embodiments, at the opposite end of spring isolator 10, spring stop 20 may be configured to engage track/groove 22, inner wall 24, and/or outer wall 26 of spring isolator 10. In embodiments, one or more drains 30 may be configured to engage track/groove 22, inner wall 26, and/or outer wall 26 of spring isolator 10. In embodiments, drain 30 may be configured proximately to (e.g., near), ramp 18 and/or spring stop 20. In embodiments, drain 30 may be configured distally from (e.g., far), ramp 18 and/or spring stop 20. In embodiments, drain 30 may be configured to align with flow holes 16 and/or locator pin holes 40 of spring isolator 10 and spring seat 32, respectively.

FIG. 8 generally illustrates spring seat 32 associated with spring isolator 10. Spring isolator 10 may be engage spring seat 32 via one or more locator pins 28. One or more locator pins 28 may be included with reinforcing insert 14 and/or spring isolator 10. In embodiments, locator pins 28 may engage spring seat 32 via one or more locator pin holes 40. In embodiments, locator pins 28 may include fastening elements (e.g., threads, rivets), that may secure spring isolator 10 to spring seat 40. In embodiments, locator pins 28 may be processed (e.g., welded, compressed, flattened), after insertion in locator pin holes 40. In embodiments, spring isolator 10 may include one or more cavities 12. Cavity 12 may be configured on spring isolator 10 such that cavity 12 may engage spring seat 32 via a raised portion 42 of spring seat 32. In embodiments, locator pins 28 and/or raised portion 42 may engage (e.g., interlock), with spring isolator 10. Locator pins 28 and/or raised portion 42 may permit spring isolator 10 to remain in indentation 36 of spring seat 32. In embodiments, locator pins 28 and/or raised portion 42 may permit an operator to position spring isolator 10 in indentation 36 of spring seat 10.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A spring isolator assembly, the assembly comprising:
   a reinforcing insert, wherein the reinforcing insert includes a ramp at a first end and a spring stop at a second end, wherein a thickness of the insert, in a vertical direction, varies along a curved length of the insert; and
   an outer layer comprised of a moldable material that is configured to receive a portion of a spring, the outer layer including a spring track, an inner wall, and an outer wall, wherein the outer layer completely surrounds the insert.

2. The spring isolator assembly of claim 1, wherein the insert comprises a metal or polymer.

3. The spring isolator assembly of claim 1, wherein the insert includes at least one passage provided between the ramp and the spring stop.

4. The spring isolator assembly of claim 1, wherein a thickness of the insert, in the vertical direction, at the first end, and a thickness of the insert, in the vertical direction, at the second end, are both thicker than a thickness of the insert between the ramp and the spring stop.

5. The spring isolator assembly of claim 1, wherein the spring track is disposed between the ramp at the first end of the insert and the spring stop at the second end of the insert.

6. The spring isolator assembly of claim 5, wherein at least one of the spring track, the inner wall, and the outer wall selectively engage a portion of the spring.

7. The spring isolator assembly of claim 6, wherein the inner wall and the outer wall engage a portion of the ramp and the spring stop.

8. The spring isolator assembly of claim 1, wherein one or more of the spring stop of the insert and the outer layer is configured to engage an end of the spring.

9. The spring isolator assembly of claim 1, wherein the outer layer includes a drain, wherein the drain is configured to remove water and/or debris from the spring track.

10. The spring isolator assembly of claim 1, the outer layer further comprising a cavity, wherein the cavity is configured to engage a portion of a spring seat.

11. The spring isolator assembly of claim 1, wherein a thickness of the ramp, in the vertical direction, varies along a curved length of the ramp; and the thickness of the ramp is greater than the thickness of the insert between the ramp and the spring stop.

12. A spring isolator assembly, the assembly comprising:
    a curvilinear reinforcing insert comprised of a metal or a polymer, wherein the curvilinear reinforcing insert includes a ramp at a first end, a spring stop at a second end, and a plurality of flow holes provided between the ramp and the spring stop; and
    a curvilinear outer layer comprised of a moldable material, wherein moldable material extends through the plurality of flow holes, and the outer layer surrounds the curvilinear reinforcing insert;
    wherein a thickness of the curvilinear reinforcing insert, in a vertical direction, varies along a curved length of the curvilinear reinforcing insert, and the thickness of the ramp is greater than the thickness of the curvilinear reinforcing insert adjacent the ramp.

13. The spring isolator assembly of claim 12, wherein the curvilinear insert includes one or more of a locator pin, a raised portion, and a cavity, wherein the locator pin, the raised portion, and the cavity is configured to selectively engage a spring seat.

14. The spring isolator assembly of claim 13, wherein a portion of the locator pin extends through the curvilinear outer layer to selectively engage a spring seat.

15. The spring isolator assembly of claim 12, wherein the curvilinear outer layer includes a spring track disposed between an inner wall and an outer wall.

16. The spring isolator assembly of claim 15, wherein at least one of the spring track, the inner wall, and the outer wall of the curvilinear outer layer is configured to selectively engage a spring.

17. A spring isolator assembly, the assembly comprising:
    a reinforcing insert, wherein the reinforcing insert includes a ramp at a first end, wherein a thickness of the reinforcing insert, in a vertical direction, varies along a curved length of the reinforcing insert, and the thickness of the ramp is greater than the thickness of the reinforcing insert adjacent the ramp; and
    a radial outer layer comprised of a moldable material, wherein the radial outer layer surrounds the reinforcing insert.

18. The spring isolator assembly of claim 17, wherein the ramp is situated between 145 degrees and 212 degrees radially from the spring stop.

19. The spring isolator assembly of claim 17, wherein a plurality of fill holes provided along the reinforcing insert between the ramp and a spring stop.

20. The spring isolator assembly of claim 17, wherein a thickness of the reinforcing insert, in a vertical direction, at the first end, and a thickness of the reinforcing insert, in a vertical direction, at a second end, are both thicker than a thickness of the reinforcing insert between the ramp and the second end.

\* \* \* \* \*